May 6, 1930.  E. BERGDAL  1,757,610
SAWYER'S HOOK
Filed April 14, 1928
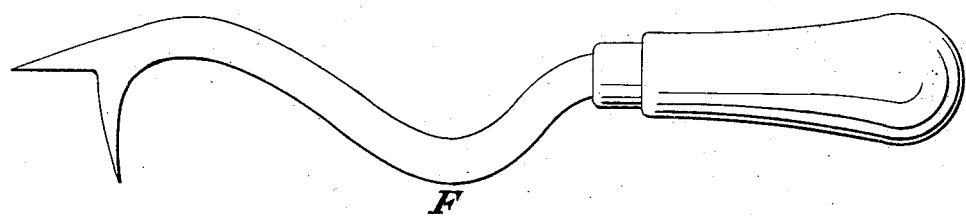
Ed. Bergdal
*Inventor*

Patented May 6, 1930

1,757,610

UNITED STATES PATENT OFFICE

EYVIND BERGDAL, OF SEATTLE, WASHINGTON

SAWYER'S HOOK

Application filed April 14, 1928. Serial No. 270,110.

The invention pertains to an improvement in an appliance used as an aid in manipulating pieces of lumber which are being worked in a woodworking machine or which otherwise are subject to similar handling, said appliance consisting of a stem having a handle at one end and a hooked prong, and sometimes also a more or less straight prong, at the other end. Various forms of this appliance are also used for a number of purposes other than that mentioned. The appliance is hereinafter called a sawyer's hook.

The object of the invention is to provide a simple and effective means for instantly releasing the hooked prong of a sawyer's hook from the wood or other material into which it has been driven.

The accompanying drawing is a side view of one form of the improved sawyer's hook. This shows an appliance which has a stem terminating in two sharp prongs, one hooked and the other approximately in line with the axis of the handle. Between the handle and the other extremity of the stem the latter is bent into a curve which is concave on the upper side. When the hooked prong has been driven into a piece of material it may be released by bringing the point F into contact with the surface of the said material and pressing downward on the handle, the point F thus forming the fulcrum of a lever of the nature sometimes called "a lever of the first class."

The said fulcrum may of course be provided for by other means than that shown in the drawing. Thus, one might use a straight stem with a projection at a right angle, instead of a curved stem.

Many appliances of a similar nature have been used for various purposes. In all of these said appliances, however, it has been necessary in order to release the hooked prong either to raise the handle until the prong is torn loose or else to work the prong loose by waggling the handle while exerting a force on the said handle tending to lift or draw the prong away from the material into which it has penetrated. The first method involves an extensive movement of the handle, which movement cannot be executed at arms-length thus often requiring a change in the position of the operator and a relatively long period of time for its execution; it also generally results in tearing loose part of the material into which the prong has been driven. The other method is slow and awkward and also often results in damage to the said material in the form of an enlarged hole.

The improved appliance described herein may be instantly released, even at arms-length, with very little effort and with absolutely no damage to the material handled, beyond that which may previously have been done in inserting the hooked prong.

The specific claim is:

A sawyer's hook having a projection on the middle part of the stem of the said hook, said projection, when brought into contact with the material to which the said hook is applied, forming a fulcrum around which the said hook may rotate in the manner of a lever of the first class.

EYVIND BERGDAL.